US007621663B2

(12) United States Patent
Tajima et al.

(10) Patent No.: US 7,621,663 B2
(45) Date of Patent: Nov. 24, 2009

(54) LAMP DEVICE FOR VEHICLES

(75) Inventors: Keiichi Tajima, Shizuoka (JP);
Tsutomu Takiguchi, Shizuoka (JP);
Naoki Takii, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 220 days.

(21) Appl. No.: 11/820,081

(22) Filed: Jun. 18, 2007

(65) Prior Publication Data

US 2008/0089086 A1 Apr. 17, 2008

(30) Foreign Application Priority Data

Oct. 12, 2006 (JP) ............................. 2006-278965

(51) Int. Cl.
*B60Q 1/06* (2006.01)
*F21V 21/14* (2006.01)
(52) U.S. Cl. ..................... 362/530; 362/526; 362/524
(58) Field of Classification Search ......... 362/523–539, 362/464–469, 285–289, 386, 272
See application file for complete search history.

(56) References Cited

U.S. PATENT DOCUMENTS

| 6,799,876 | B2 | 10/2004 | Ravier | |
|---|---|---|---|---|
| 7,121,706 | B2 * | 10/2006 | Takiguchi et al. | 362/524 |
| 7,175,319 | B2 * | 2/2007 | Tajima et al. | 362/465 |
| 7,315,127 | B2 * | 1/2008 | Tajima | 315/82 |
| 7,364,331 | B2 * | 4/2008 | Tajima | 362/509 |
| 7,387,415 | B2 * | 6/2008 | Tajima et al. | 362/513 |
| 2003/0039124 | A1 * | 2/2003 | Tawa et al. | 362/464 |
| 2005/0141234 | A1 * | 6/2005 | Tajima et al. | 362/524 |

FOREIGN PATENT DOCUMENTS

| CN | 2348894 Y | 11/1999 |
|---|---|---|
| JP | 2003-054310 | 2/2003 |
| JP | 2005119463 | 5/2005 |
| JP | 2005-186731 | 7/2005 |

OTHER PUBLICATIONS

English Abstract of JP2005119463 published May 12, 2005, Data supplied from the esp@cenet database, 1 page.
English Abstract of JP2005186731 published Jul. 14, 2005, Data supplied from the esp@cenet database, 1 page.
English Abstract of JP2003054310 published Feb. 26, 2003, Data supplied from the esp@cenet database, 1 page.
Chinese Office Action for patent application No. 2007101065906, Date of Issuance: Feb. 27, 2009, and English translation thereof, 16 pages.

* cited by examiner

*Primary Examiner*—Bao Q Truong
(74) *Attorney, Agent, or Firm*—Osha • Liang LLP (57) ABSTRACT

A lamp device for vehicles includes a lamp unit for irradiating light in a desired light distribution pattern, a support body configured to support the lamp unit so as to be tiltable up and down, and tiltable right and left, and an actuator for tilting the lamp unit up and down with respect to the support body, and for tilting the lamp unit right and left with respect to the support body. The actuator includes a right-and-left tilting mechanism and an up-and-down tilting mechanism provided in an actuator housing. The right-and-left tilting mechanism includes an output shaft capable of turning in a right-and-left direction coupled to said lamp unit. The up-and-down tilting mechanism includes an output portion capable of moving said actuator housing back and forth with respect to the support body.

16 Claims, 9 Drawing Sheets

FIG. 9

LAMP DEVICE FOR VEHICLES

This application claims foreign priority from Japanese Patent Application No. 2006-278965, filed on Oct. 12, 2006, the entire contents of which are hereby incorporated by reference.

BACKGROUND OF THE INVENTION

1. Field of the Invention

This invention relates to a novel lamp device for vehicles. More specifically, the invention relates to an art for arbitrarily changing the direction of irradiation up and down, and right and left.

2. Related Art

Some lamp devices for vehicles, for example, some headlights for automobiles are capable of arbitrarily changing the direction of irradiating light up and down, and right and left.

A device disclosed in a patent document 1 has a lamp unit supported by a bracket which can be tilted right and left, and up and down. Namely, the bracket is tilted right and left by driving an actuator for right-and-left tilting, and is tilted up and down by driving an actuator for up-and-down tilting.

In a lamp device for vehicles disclosed in a patent document 2, the turn in the right-and-left direction and the turn in the up-and-down direction are effected by one actuator.

In a lamp device for vehicles disclosed in a patent document 3, the turn in the right-and-left direction and the turn in the up-and-down direction are also effected by one actuator.

[Patent document 1] JP-A-2005-119463

[Patent document 2] JP-A-2005-186731

[Patent document 3] JP-A-2003-54310

In the lamp device for vehicles disclosed in the above patent document 1, however, the actuator for tilting the bracket right and left is separate from the actuator for up-and-down tilting, which, therefore, requires an increased number of parts and an increased number of assembling steps, as well as an increased number of harnesses for feeding power to the actuators and for controlling them, causing an increase in the cost. Further, the actuators cannot be used in common for the right and left light devices, which also increases the cost.

According to the lamp device for vehicles disclosed in the above patent document 2, the linking point of the actuator to the bracket for right-and-left tilting is away from the linking point thereof to the bracket for up-and-down tilting and their positional relations are fixed without offering general applicability. Therefore, brackets are necessary that are exclusively designed for the actuators. Further, dedicated actuators are necessary for the right and left lamp devices.

In the lamp device for vehicles disclosed in the patent document 3, the actuator has only one output portion, and the actuator can be used in common for the right and left lamp devices. However, it is not able to effect the tilting in the right-and-left direction simultaneously with the tilting in the up-and-down direction.

SUMMARY OF THE INVENTION

One or more embodiments of the present invention provide a lamp device for vehicles equipped with an actuator which offers excellent general applicability.

The lamp device for vehicles according to one or more embodiments of the invention comprises a lamp unit for irradiating light in a desired light distribution pattern, a support body configured to support the lamp unit so as to be tiltable up and down, and tiltable right and left, and an actuator for tilting the lamp unit up and down with respect to said support body, and for tilting said lamp unit right and left with respect to the support body, wherein the actuator comprises right-and-left tilting means and up-and-down tilting means provided in an actuator housing, the right-and-left tilting means comprises an output shaft capable of turning in a right-and-left direction coupled to the lamp unit, and the up-and-down tilting means comprises an output portion capable of moving the actuator housing back and forth with respect to the support body.

In a lamp device for vehicles in accordance with one or more embodiments of the present invention, therefore, there is only one linking point between the actuator and the lamp unit. In assembling the lamp device, therefore, there is no need of taking the positional relationship between two different linking points into consideration, offering excellent general applicability. Besides, the device is able to tilt the lamp unit in the right-and-left direction, and in the up-and-down direction simultaneously.

The lamp device for vehicles according to one or more embodiments of the invention comprises a lamp unit supported by a support body so as to be tiltable up and down, and tiltable right and left, and a two-function actuator for tilting said lamp unit up and down with respect to said support body, and for tilting said lamp unit right and left with respect to said support body; said two-function actuator comprising, in an actuator housing: an output shaft capable of turning in a right-and-left direction coupled to said lamp unit; and an output gear capable of moving said actuator housing back and forth with respect to the support body.

In the lamp device for vehicles in accordance with one or more embodiments of the present invention, therefore, there is only one linking point between the actuator and the lamp unit. In assembling the lamp device, therefore, there is no need of taking the positional relationship between two different linking points into consideration, offering excellent general applicability. Besides, the device is able to tilt the lamp unit in the right-and-left direction, and in the up-and-down direction simultaneously.

According to one or more embodiments of the invention, the actuator housing is supported by the support body via slide rails extending in a back-and-forth direction. Therefore, the motion of the actuator housing in the back-and-forth direction is correctly limited, and the direction of irradiation can be correctly changed in the up-and-down direction.

According to one or more embodiments of the invention, the slide rails are provided on the outermost sides on both the right and left sides of the actuator housing. This increases the gap between the two slide rails and, further, stabilizes the motion of the actuator housing.

According to one or more embodiments of the invention, in the actuator, the output shaft of the right-and-left tilting means, the output portion of the up-and-down tilting means, and a connector for feeding power supply and control signals to the two tilting means are arranged nearly on a straight line extending in the back-and-forth direction and at positions maintaining nearly an equal distance to the right and left slide rails. Therefore, the slide rails which are the portions related to supporting the actuator are positioned symmetrically in the right-and-left direction concerning the output shaft which is a portion related to controlling the attitude of the lamp unit and concerning the output portion of the up-and-down tilting means. Accordingly, the actuator of the one kind can be used for the lamp devices of both the right and left sides. This eliminates the necessity of providing actuators of separate specifications for the right and left lamp devices, making it possible to lower the cost of the actuator and the cost of the bracket for supporting the actuator.

According to one or more embodiments of the invention, the actuator housing is supported by the support body via a sub-bracket that supports the slide rails so as to slide in the back-and-forth direction, and the actuator housing and the sub-bracket are provided with a turn-limit groove that extends in the back-and-forth direction and with a turn-limit boss that engages with the turn-limit groove so as to slide in the back-and-forth direction. This limits the turn of the actuator itself and makes it possible to more correctly change the direction of irradiation.

Other aspects and advantages of the invention will be apparent from the following description and the appended claims.

DETAILED DESCRIPTION OF THE EXEMPLARY EMBODIMENTS

Described below with reference to the drawings are exemplary embodiments of the lamp device for vehicles of the present invention. The illustrated embodiments are examples of when the invention is applied to a headlight for an automobile.

First, the outline of the headlight for the automobile will be described with reference to FIG. 1.

A headlight 10 for the automobile comprises a lamp unit 30 that is arranged in a housing 20 having a lamp chamber 21 which is a nearly sealed space, the lamp unit 30 being allowed to turn up and down, and right and left. In the housing 20, an opening is covered with a transparent cover 23 in the front surface of a lamp body 22 of the shape of a container having an opening in the front.

In the headlight 10 for the automobile that is shown, the lamp unit 30 is supported on the lamp body 22 via a bracket 40 which is a support body so as to be tilted up and down, and right and left. However, the lamp unit may be directly supported by the lamp body so as to be tilted up and down, and right and left. When the lamp unit is directly supported by the lamp body without using the bracket, the lamp body becomes the support body that is referred to in the claims.

A two-function actuator 50, which is a device for adjusting the direction of irradiation, is supported by the bracket 40.

The lamp unit 30 is coupled to an output portion of the two-function actuator 50. The lamp unit 30 being supported by the bracket 40 so as to be tilted up and down, and right and left.

A discharge lamp turn-on circuit 60 is arranged in the housing 20, and the lamp unit 30 is turned on by the discharge lamp turn-on circuit 60.

Figure 1:
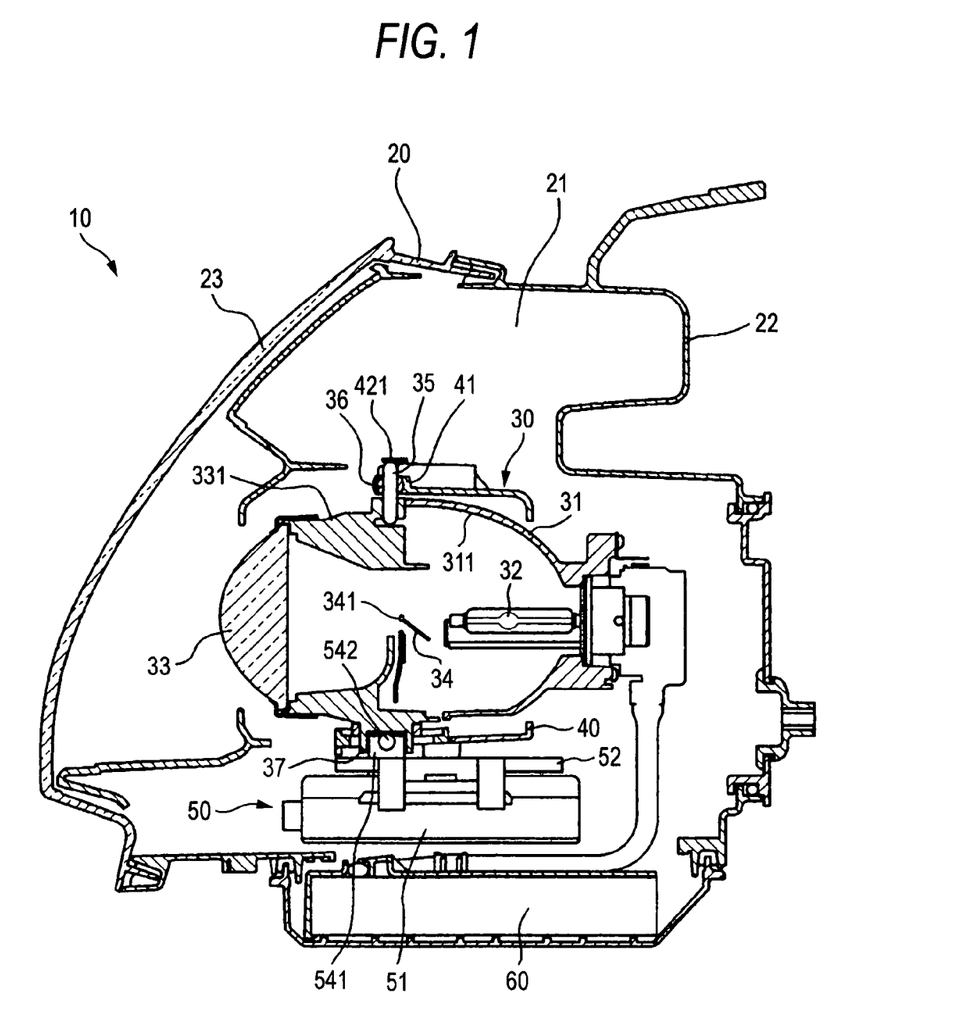
FIG. 1 illustrates an embodiment of when a lamp device for vehicles of the invention is applied to a headlight for an automobile, and is a vertical sectional view schematically showing the whole device.
Figure 2:
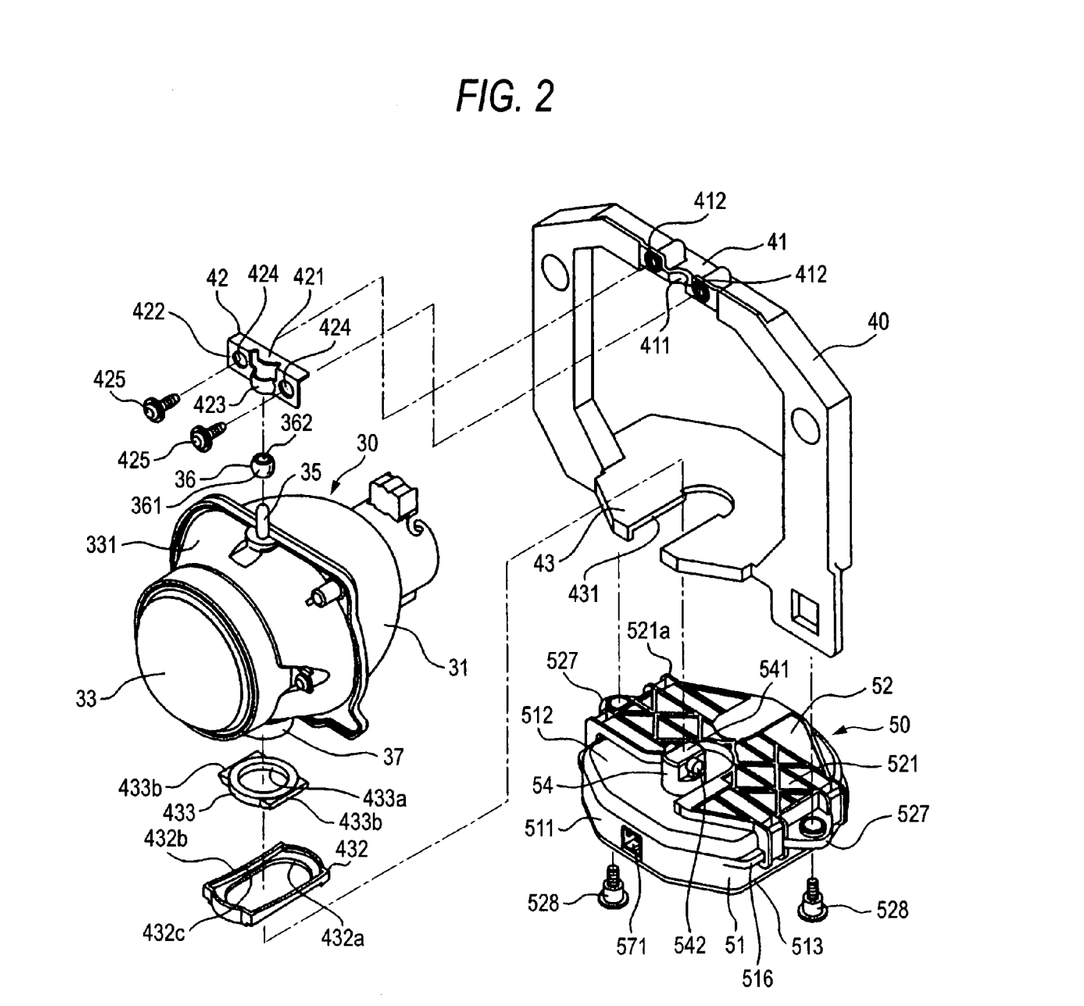
FIG. 2 is a disassembled perspective view showing a lamp unit and a two-function actuator separated away from a bracket.

As can be seen in FIGS. 1 and 2, the lamp unit 30 includes a reflector 31, a discharge lamp 32 held by the reflector 31, a projector lens 33 for projecting light of the discharge lamp 32 forward, and a shade 34 for shaping light of the discharge lamp 32 into a desired pattern.

The reflector 31 has a surface of reflection for collecting light of the discharge lamp 32, e.g., has a surface 311 of reflection which is an elliptic shape or of a shape close to an ellipse in vertical cross section, which is a parabolic surface or of a shape close to a parabolic surface in horizontal cross section, and which collects light of the discharge lamp 32 positioned at a first focal point of the ellipse and at the back of the focal point of the parabolic surface in a state of slightly broadening in a horizontal direction at a second focal point of the ellipse.

The projector lens 33 is a focusing lens having a convex spherical front surface and a nearly flat rear surface, and is held by a lens holder 331. With the lens holder 331 being attached to the front end of the reflector 31, the projector lens 33 is so positioned that the focal point on the rear side thereof is in the focusing region, i.e., in a region where light of the discharge lamp 32 is collected.

The shade 34 is disposed at a position midway between the discharge lamp 32 and the projector lens 33, an upper edge 341 serves as a cut-off limit edge for limiting the cut-off line that forms the upper edge of the light distribution pattern, and the focal point on the rear side of the projector lens 33 is positioned nearly at the central portion of the cut-off limit edge 341 in the right-and-left direction.

A shaft 35 protrudes upward from the upper surface at the rear end of the lens holder 331, and an automatic centering metal 36 is outwardly fitted to the shaft 35. The automatic centering metal 36 has an outer peripheral surface 361 of nearly a spherical shape and a center hole 362, and the shaft 35 is inserted in the center hole 362 so as to freely slide therein.

Figure 3:
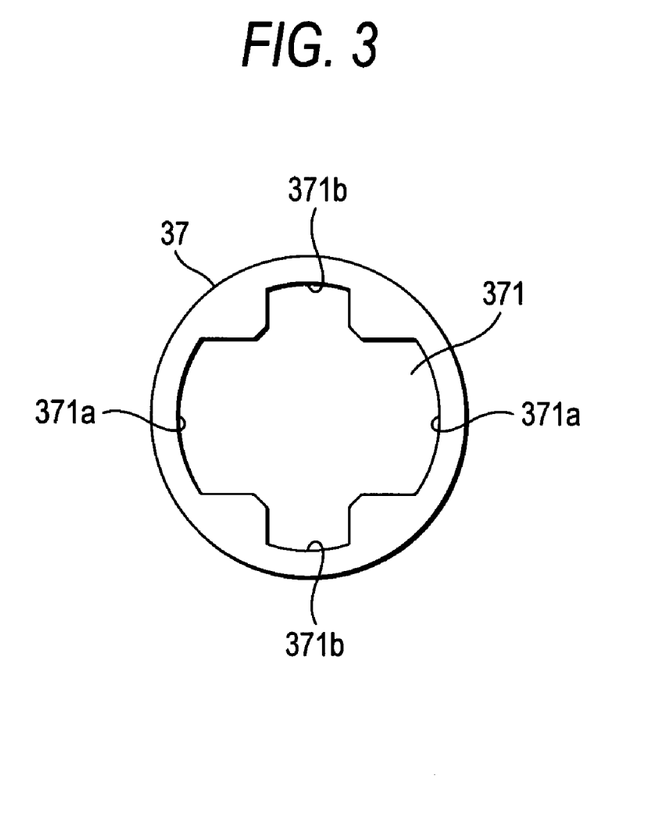
FIG. 3 is a bottom view of a coupling boss possessed by the lamp unit.

A coupling boss 37 is protruding from the lower surface of the lens holder 331 at a position corresponding to the shaft 35. The coupling boss 37 has a nearly circular outer shape and has a recessed coupling portion 371 that is opened in the lower surface thereof. As can be seen in FIG. 3, the recessed coupling portion 371 is formed in nearly a crossing shape, the portions 371a, 371a protruding back and forth being formed wide, and the portions 371b, 371b protruding right and left being formed narrower and shallower than the back and forth portions 371a, 371a.

When the discharge lamp 32 turns on in the lamp unit 30, light is reflected by the surface 311 of reflection of the reflector 31 and is collected to near the cut-off limit edge 341 of the shade 34. Light collected in the light-collecting region is shut off for its lower part by the shade 34, and this partly shut-off light is reverse-projected forward by the projector lens 33. Therefore, the beam is projected forward, the beam having a light distribution pattern with a cut-off line at the upper edge as limited by the cut-off limit edge 341 of the shade 34.

The bracket 40 is formed in nearly the shape of a frame, and a bearing portion 41 is formed in nearly the central portion of the upper end thereof in the right-and-left direction. The bearing portion 41 has a recessed receiving portion 411 that is recessed facing forward and threaded holes 412, 412 formed in both side portions of the recessed receiving portion 411, the threaded holes 412, 412 opening forward. The recessed receiving portion 411 is formed in nearly a recessed spherical shape. The curvature of the recessed spherical surface of the recessed receiving portion 411 is nearly the same as the curvature of the outer peripheral surface 361 of the automatic centering metal 36.

A metal holder 42 is fixed to the bearing portion 41 of the bracket 40. The metal holder 42 is formed by folding a metal plate, i.e., is formed so that a front surface portion 422 protrudes downward from the front edge of the upper surface portion 422 integrally therewith, and the central portion of the front surface portion 422 in the right-and-left direction is forming a holding portion 423 arcuately protruding forward at a central portion of the front surface portion 422 in the right-and-left direction. The back surface of the holding portion 423 is forming a recessed spherical surface that is recessed facing backward, and the curvature of the recessed spherical surface is nearly the same as the curvature of the outer peripheral surface 361 of the automatic centering metal 36. Screw insertion holes 424, 424 are formed in both side portions of the front surface portion 422.

The bracket 40 is positioned so as to surround the lamp unit 30, the outer peripheral surface 361 of the automatic centering metal 36 is partly fitted to the recessed receiving portion 411 of the bearing portion 41, the recessed spherical surface on the back surface of the holding portion 423 of the metal holder 42 is fitted to a portion positioned on the front side of the outer peripheral surface 361 of the automatic centering metal 36 and, in this state, fixing screws 425, 425 are inserted in the screw insertion holes 424, 424 in the metal holder 42 and are screwed into the threaded holes 412, 412 in the bearing portion 41. Thus, the metal holder 42 is fixed to the bearing portion 41, and the automatic centering metal 36 is supported so as to turn being held by the recessed receiving portion 411 of the bearing portion 41 and by the holding portion 423 of the metal holder 42. Accordingly, the lamp unit 30 is allowed to turn right and left, and up and down with the automatic centering metal 36 as a fulcrum of turn. Here, the shaft 35 is allowed to slide relative to the automatic centering metal 36, and the lamp unit 30 is allowed to move up and down relative to the bracket 40.

The bracket 40 has a lower support portion 43 in the shape of a plate that extends nearly horizontally in the lower portion thereof. The lower support portion 43 has a notch 431 that is opened at the front end thereof and is extending back and forth. A slide metal 432 is supported by the notch 431. The slide metal 432 is nearly of a rectangular shape which is elongated back and forth, and a slide hole 432a which is elongated back and forth is formed therein so as to occupy the whole portion thereof. Further, a low circumferential wall 432b is formed along the circumferential edge of the slide metal 432 and protruding upward to thereby form a slide groove 432c surrounded by the circumferential wall 432b. The slide metal 432 is attached to the lower support portion 43 of the bracket 40 so as to cover the notch 431.

A thrust metal 433 is engaged with the slide metal 432 so as to slide. The thrust metal 433 has a circular insertion hole 433a and engaging wings 433b, 433b on both the right and left side portions thereof. The distance between the engaging wings 433b, 433b is nearly equal to the width of the side groove 432c formed in the slide metal 432. The coupling boss 37 of the lamp unit 30 is placed on the thrust metal 433, and the engaging wings 433b, 433b of the thrust metal 433 are engaged with the slide grooves 432c in the slide metal 432 so as to slide. In this state, the output shaft of an actuator that will be described later is engaged with the recessed coupling portion 371 of the coupling boss 37 passing through the insertion hole 432 of the thrust metal.

As the automatic centering metal 36 turns in a state of being held by the recessed receiving portion 411 of the bearing portion 41 and by the holding portion 423 of the metal holder 42 and as the coupling boss 37 turns in a state of being placed on the thrust metal 433 as described above, the lamp unit 30 supported by the bracket 40 turns about an axis that extends connecting the centers of the shaft 35 and the coupling boss 37. Further, as the output shaft that will be described later moves back and forth, the coupling boss 37 moves back and forth along the slide grooves 432c in the slide metal 432 together with the thrust metal 433. Besides, as the automatic centering metal 36 turns in a state of being supported by the recessed receiving portion 411 of the bearing portion 41 and by the holding portion 423 of the metal holder 42, the axis that extends connecting the centers of the shaft 35 and the coupling boss 37 tilts in the up-and-down direction and, therefore, the lamp unit 30 tilts in the up-and-down direction.

Though not shown, the bracket 40 is supported by the lamp body 22 so as to be tilted right and left, and up and down via a known gap-adjusting portion by utilizing an adjusting screw or nut like a known turn fulcrum portion.

The two-function actuator 50 is supported on the lower side of a lower support portion 43 of the bracket 40. The two-function actuator 50 includes an actuator housing 51 holding a circuit board and a mechanical portion, and a sub-bracket 52. The sub-bracket 52 is fixed to, and supported by, the lower surface of the lower support portion 43 of the bracket 40, and the actuator housing 51 is supported by the sub-bracket 52 so as to move back and forth.

Figure 4:
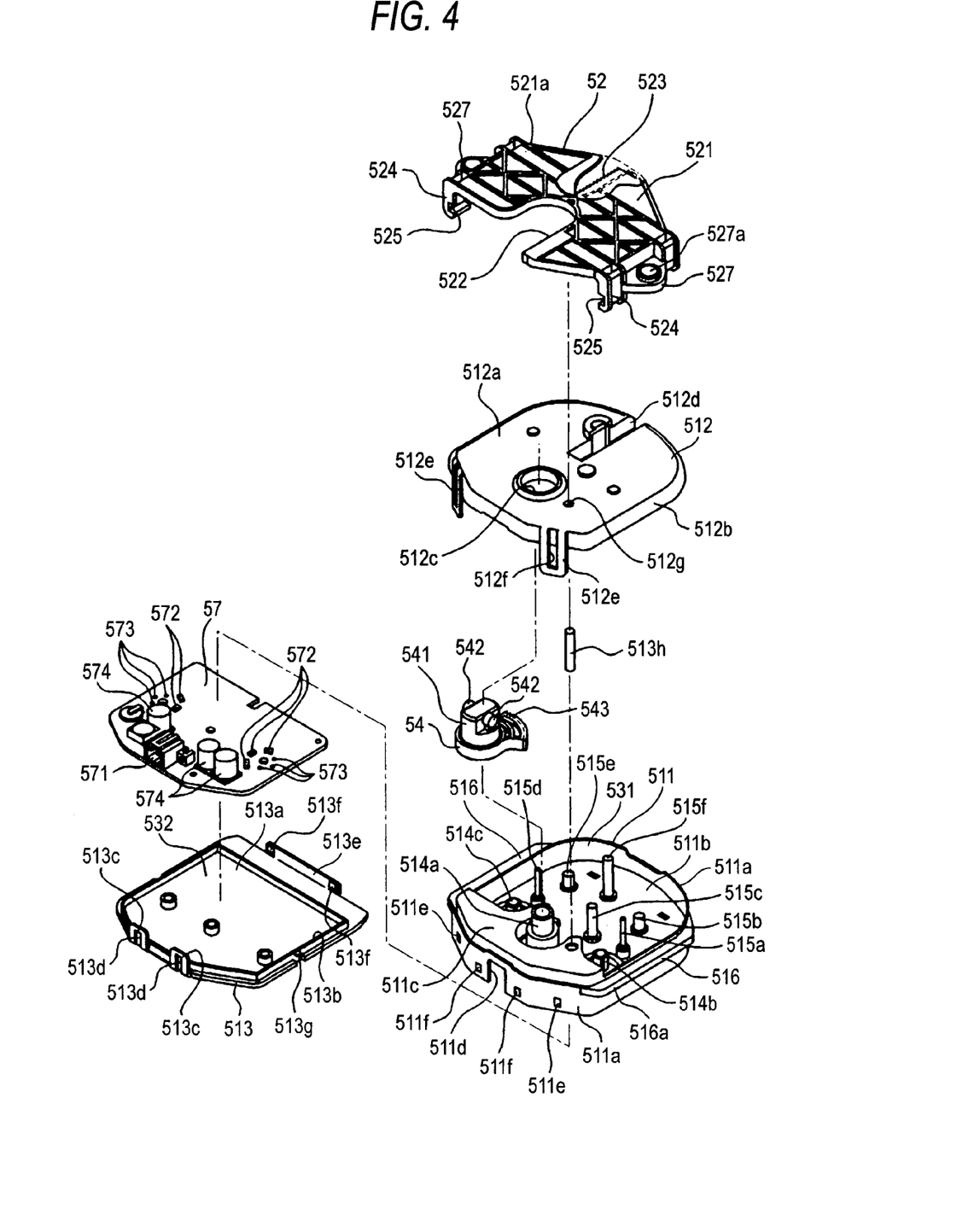
FIG. 4 is a perspective disassembled view schematically illustrating the constitution of a housing of the two-function actuator.
Figure 9:
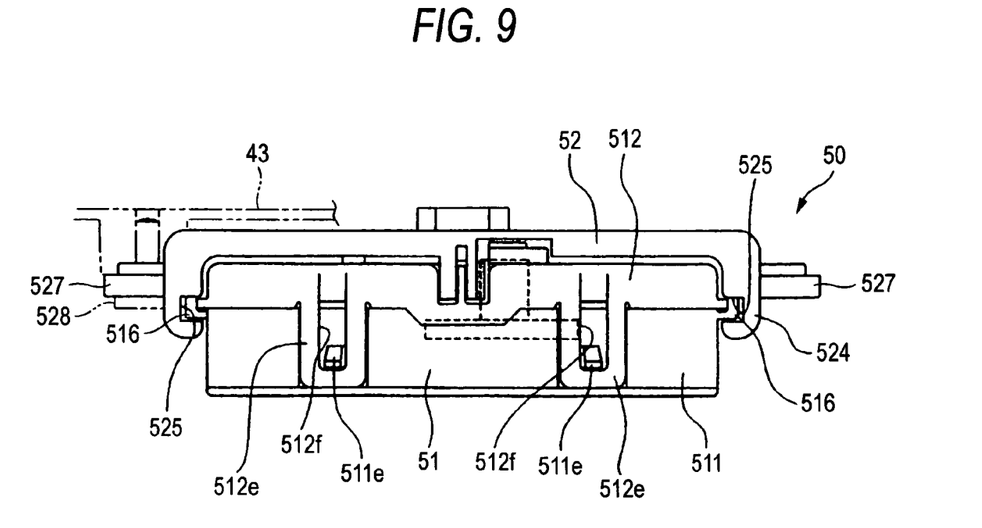
FIG. 9 is a schematic back view of the two-function actuator.

As can be seen in FIGS. 4 and 9, the actuator housing 51 comprises a main housing portion 511, a housing cover 512 and a bottom housing portion 513. The main housing portion 511 is nearly of a right-and-left symmetrical shape as viewed on a plane, and the inside of a peripheral wall portion 511a is divided up and down by an intermediate wall 511b. The intermediate wall 511b has a front end portion 511c, which is higher than other portions, and a space having a large size in the up-and-down direction is formed on the lower side of the front end portion 511c. Support cylinders 514a, 514b and 514c are protruding on the intermediate wall 511b, and gear support shafts 515a, 515b, 515c, 515d, 515e and 515f are studded on the intermediate wall 511b.

A notch 511d for exposure is formed in the front surface of the peripheral wall portion 511a in the right-and-left direction. Further, engaging protrusions 511e, 511e, 511f and 511f are protruded on the outer peripheral surface of the front surface portion of the peripheral wall portion 511a. Moreover, engaging protrusions 511e, 511e are formed on the back surface of the peripheral wall portion 511a (see FIG. 9).

Slide rails 516 and 516 are protruding sideward at positions close to the upper ends of the main housing portion 511 on both sides thereof, the slide rails 516 and 516 extending in the back-and-forth direction. Outer ends 516a and 516a of the slide rails 516 and 516 are positioned on the outermost sides of the actuator housing 51, and are in parallel with each other.

The housing cover 512 has an upper surface portion 512a of a shape nearly covering the upper surface of the main housing portion 511, and a peripheral wall portion 512b protruding downward from the peripheral edge portion of the upper surface portion 512a. A through hole 512c is formed in the upper surface portion 512a at a central portion close to the front end and, besides, a notch 512d is formed therein from nearly the central portion thereof up to the rear end in the back-and-forth direction. Further, engaging pieces 512e, 512e, . . . are protruding downward from the positions on both sides of the front end and from the positions at the rear end separated away toward the right and left, and engaging holes 512f, 512f, . . . are formed in the engaging pieces 512e, 512e, . . . . A small insertion hole 512g is formed in the upper surface portion 512a at a position close to the insertion hole 512c.

The housing cover 512 is so positioned as to cover the upper surface side of the main housing portion 511, the engaging holes 512f, 512f, . . . of the four engaging pieces 512e, 512e, . . . are engaged with the engaging protrusions 511e, 511e, . . . formed on the peripheral wall portion 511a of the main housing portion 511, and the housing cover 512 is mounted on the upper side of the main housing portion 511. A space 531 formed between the intermediate wall 511b of the main housing portion 511 and the housing cover 512 is used as mechanical space for constituting mechanical portions such as a motor, a gear-linking mechanism for transmitting the rotation of the motor to the output portion, and the like.

The bottom housing portion 513 has a bottom surface portion 513a of the shape of a plate covering the bottom surface of the main housing portion 511, and is forming a peripheral wall portion 513b of a low height at a position on the inside of the outer peripheral edge of the bottom surface portion 513a. Two engaging pieces 513c, 513c are formed upward at the front end of the bottom surface portion 513a, and engaging holes 513d and 513d are formed in the engaging pieces 513c and 513c. An engaging wall 513e protrudes at the rear end of the bottom surface portion 513a, and two engaging protrusions 513f and 513f are protruding on the front surface of the engaging wall 513e. Further, engaging protrusions 513g and 513g are protruding on the outer surfaces of portions extending in the back-and-forth direction of the peripheral wall portions 513b and 513b at intermediate portions thereof in the back-and-forth direction.

Further, a turn-limit boss 513h is protruding upward on the main housing portion 511 at a position close to the support cylinder 514a. The turn-limit boss 513h further protrudes upward beyond the upper surface portion 512a of the housing cover 512 passing through the small insertion hole 512g formed in the housing cover 512.

The bottom housing portion 513 is so positioned as to cover the bottom surface side of the main housing portion 511, the engaging holes 513d and 53d in the engaging pieces 513c and 513c engage with the engaging protrusions 511f and 511f formed on the peripheral wall portion 511a of the main housing portion 511, and the engaging protrusions 513f, 513f, 513g, 513g engage with engaging portions (not shown) formed in the inner surface of the peripheral wall portion 511c of the main housing portion 511. Thus, the bottom housing portion 513 is mounted on the bottom side of the main housing portion 511. A space 532 formed between the intermediate wall 51b of the main housing portion 511 and the bottom housing portion 513 is used as the circuit space for arranging the circuit board.

Figure 5:
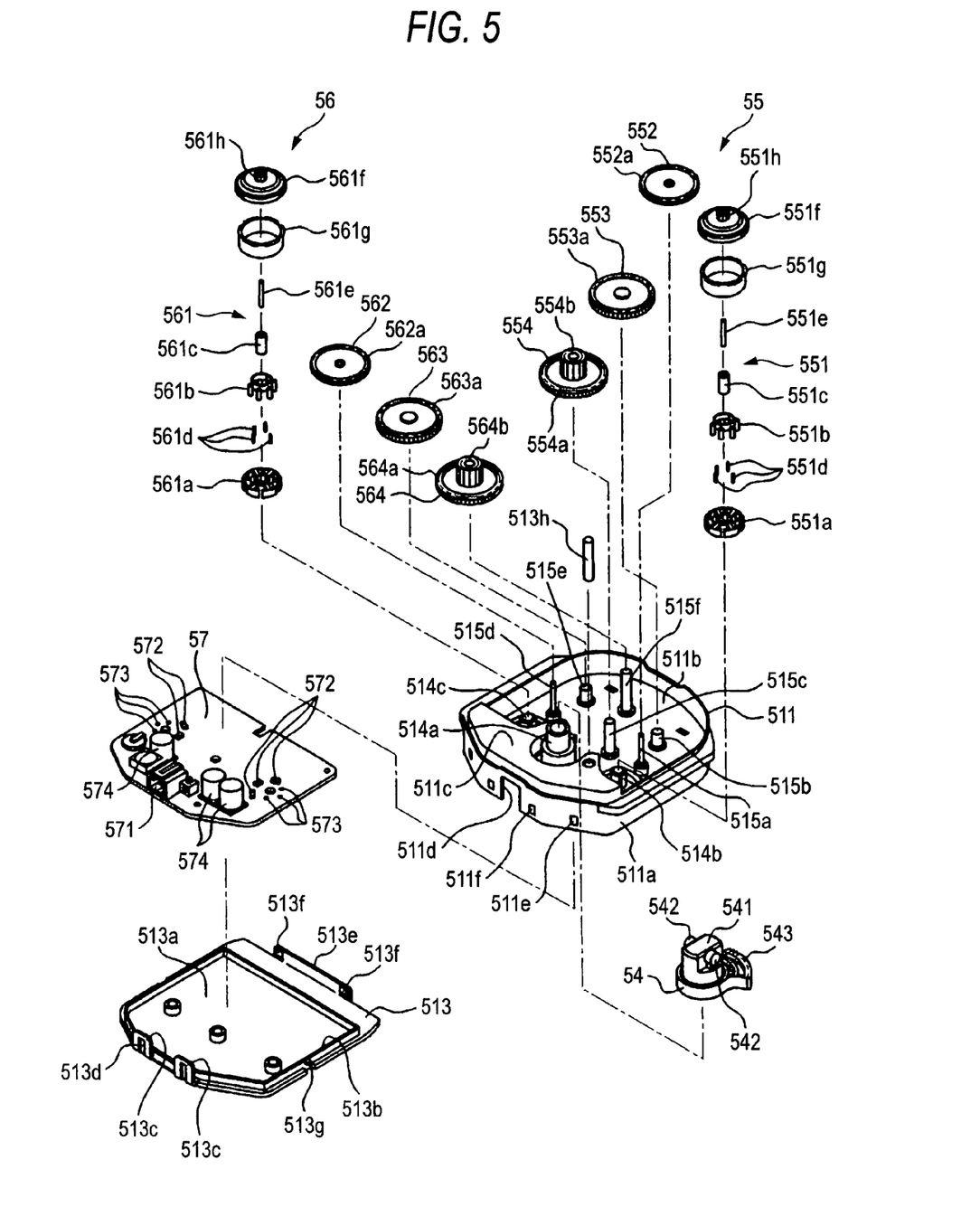
FIG. 5 is a perspective disassembled view schematically illustrating a mechanical portion of the two-function actuator.
Figure 7:
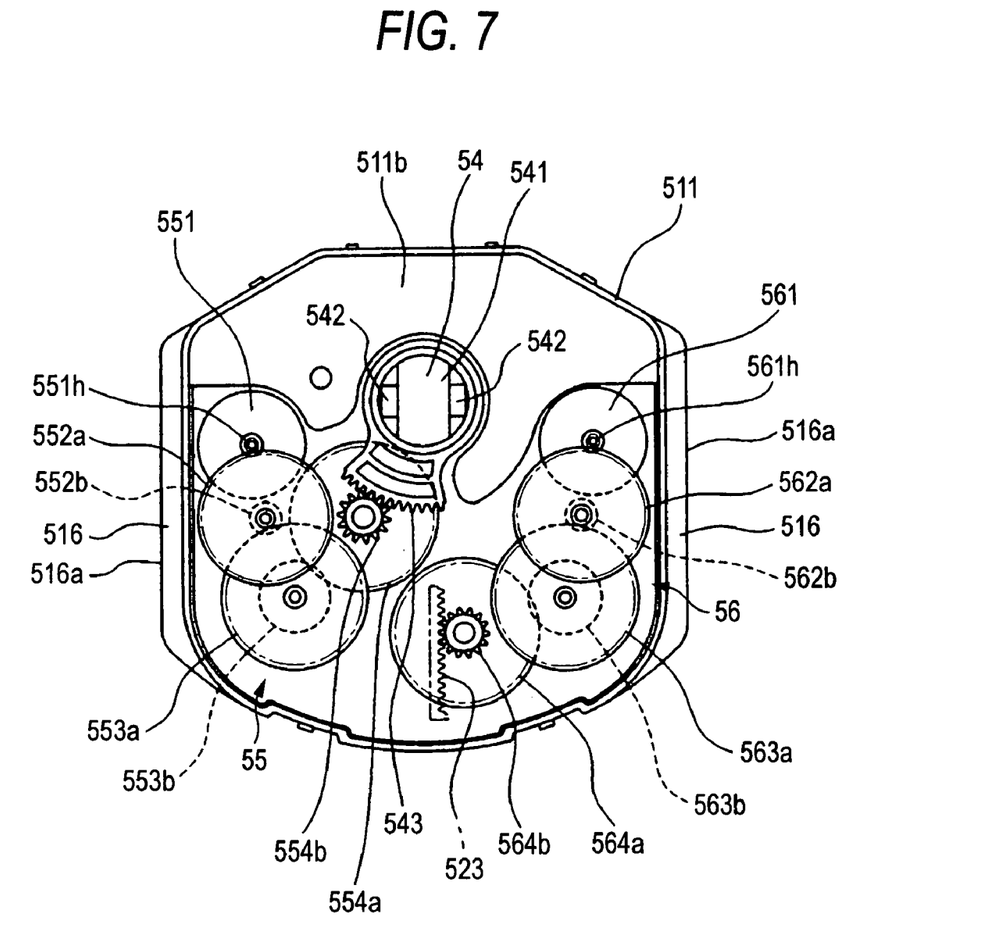
FIG. 7 is a plan view schematically illustrating the mechanical portion of the two-function actuator.

Next, the mechanical portion constituted in the mechanical space 531 will be described with reference to FIGS. 5 and 7.

The two-function actuator 50 has an output shaft 54 for turning the lamp unit 30 in the right-and-left direction. The output shaft 54 has a first engaging portion 541 of nearly a rectangular shape in the back-and-forth direction, and a second engaging portion 542 protruding sideward from the central portion in the back-and-forth direction of the first engaging portion 541. The first engaging portion 541 is formed wide, and the second engaging portion 542 is formed like a round rod of a diameter smaller than the width of the first engaging portion 541. The output shaft 54 has a sector gear portion 543 formed integrally with the engaging portions 541 and 542. The output shaft 54 is outwardly fitted to the support cylinder 514a that protrudes from the intermediate wall 511b of the main housing portion 511 and is allowed rotate. In this state, the first engaging portion 541 and the second engaging portion 542 are protruding upward from the through hole 512c in the housing cover 512.

A right-left drive mechanism 55 for turning the output shaft 54 includes a right-left motor 551, and transmission gears 552, 553 and 554 for transmitting the rotation of the motor 551 to the output shaft. The right-left motor 551 is a brushless motor. A stator portion is constituted by a core assembly 551a fixed to the periphery of the support cylinder 514b studded on the intermediate wall 511b of the main housing portion 511, an insulator 551b fixed to the periphery of the support cylinder 514b together with the core assembly 551a, and a bearing metal 551c fitted and fixed to the support cylinder 514b. A stator coil which is not shown is wound on the core assembly 551a, and terminals 551d, 551d and 551d are supported by the insulator 551b. A rotor portion includes a shaft 551e, a rotor disk 551f, and a rotor magnet 551g. The rotor disk 551f is nearly of the shape of a disk and has a drive gear 551h formed on the upper surface at the center thereof. The rotor magnet 551g is formed in a cylindrical shape and is alternately magnetized in the circumferential direction. The upper end of the rotor magnet 551g is fixed to the peripheral edge of the rotor disk 551f. Further, the shaft 551e is fixed to the rotor disk 551f so as to hang down from the center thereof. The shaft 551e is further supported by the bearing metal 551c so as to rotate. Therefore, when the stator coil (not shown) wound on the core assembly 551a is supplied with an electric current through the terminals 551d, 551d and 551d according to a predetermined phase difference, the rotor magnet 551g produces a rotational force, and the drive gear 551h rotates.

The transmission gear 552 comprises a large gear 552a and a small gear 552b formed on the lower side thereof integrally together, and is rotatably supported by a gear support shaft 515a studded on the intermediate wall 511b of the main housing portion 511, the large gear 552a being meshed with the drive gear 551h of the motor 551. The transmission gear 553 has a small gear 553b formed on the lower side of the large gear 553a integrally therewith, and is rotatably supported by a gear support shaft 515b studded on the intermediate wall 511b, the large gear 553a being meshed with the small gear 552b of the transmission gear 552. The transmission gear 554 has a small gear 554b formed on the upper side of the large gear 554a integrally therewith, and is rotatably supported by a gear support shaft 515c studded on the intermediate wall 511b, the large gear 554a being meshed with the small gear 553b of the transmission gear 553, and the small gear 554b being meshed with the sector gear portion 543 of the output shaft 54. Therefore, when the right-left motor 551 is driven, the rotation thereof is transmitted from the drive gear 551h to the sector gear portion 532 via transmission gears 552, 553 and 554, and the output shaft 54 rotates.

The up-down drive mechanism 56 includes an up-down motor 561, transmission gears 562, 563, and an output gear 564.

The up-down motor 561 is a brushless motor. A stator portion is constituted by a core assembly 561a fixed to the periphery of the support cylinder 514c studded on the intermediate wall 511b of the main housing portion 511, an insulator 561b fixed to the periphery of the support cylinder 514c together with the core assembly 561a, and a bearing metal 561c fitted and fixed to the support cylinder 514c. A stator coil which is not shown is wound on the core assembly 561a, and terminals 561d, 561d, and 561d are supported by the insulator 561b. A rotor portion includes a shaft 561e, a rotor disk 561f, and a rotor magnet 561g. The rotor disk 561f is nearly of the shape of a disk and has a drive gear 561h formed on the upper surface at the center thereof. The rotor magnet 561g is formed in a cylindrical shape and is alternately magnetized in the circumferential direction. The upper end of the rotor magnet 561g is fixed to the peripheral edge of the rotor disk 561f. Further, the shaft 561e is fixed to the rotor disk 561f so as to hang down from the center thereof. The shaft 561e is further supported by the bearing metal 561c so as to rotate. Therefore, when the stator coil (not shown) wound on the core assembly 561a is supplied with an electric current through the terminals 561d, 561d, and 561d according to a predetermined phase difference, the rotor magnet 561g produces a rotational force, and the drive gear 561h rotates.

The transmission gear 562 comprises a large gear 562a and a small gear 562b formed on the lower side thereof integrally together, and is rotatably supported by a gear support shaft 515d studded on the intermediate wall 511b, the large gear 562a being meshed with the drive gear 561h of the motor 561. The transmission gear 563 has a small gear 563b formed on the lower side of the large gear 563a integrally therewith, and is rotatably supported by a gear support shaft 515e studded on the intermediate wall 511b, the large gear 563a being meshed with the small gear 562b of the transmission gear 562. The output gear 564 has a pinion gear 564b studded on the upper surface of the large gear 564a integrally therewith, and is rotatably supported by a gear support shaft 515f studded on the intermediate wall 511b, the large gear 564a being meshed with the small gear 563b of the transmission gear 563. Therefore, when the up-down motor 561 is driven, the rotation thereof is transmitted from the drive gear 561h to the output gear 564 via transmission gears 562 and 563, and the pinion gear 564b rotates.

A circuit board 57 forming a control circuit for controlling the rotations of the two motors 551, 561 is arranged in the circuit space 532. A connector 571 is arranged on the upper surface of the circuit board 57 at a front end thereof and at a central portion in the right-and-left direction. The power source and control signals are fed to the control circuit on the circuit board 57 from an external unit through the connector 571. The connector 571 faces outward through the notch 511d formed in the front surface of the circumferential wall 511a of the main housing portion 511. Hall devices 572, 572, . . . are arranged on the circuit board 57 at places corresponding to the motors 551, 561. The Hall devices 572, 572, . . . are facing the lower ends of rotor magnets 551g, 561g through holes (not shown) formed in the intermediate wall 511b of the main housing portion 511, and detect the rotational positions of the rotor magnets 551g and 561g. The terminals 551d, 551d, 551d, 561d, 561d, 561d are inserted in holes (not shown) formed in the intermediate wall 511b, inserted in insertion holes 573, 573, . . . formed in the circuit board 57, connected to circuit conductors (not show) formed on the lower surface of the circuit board 57, and feed currents to a stator coil that is not shown via the terminals 551d, 551d, 551d, 561d, 561d, 561d. Of the electronic parts mounted on the circuit board 57, tall electronic parts 574, 574, . . . are positioned in space having a large size in the up-and-down direction formed on the lower side of the front end portion 511c of the intermediate wall 511b.

Figure 6:
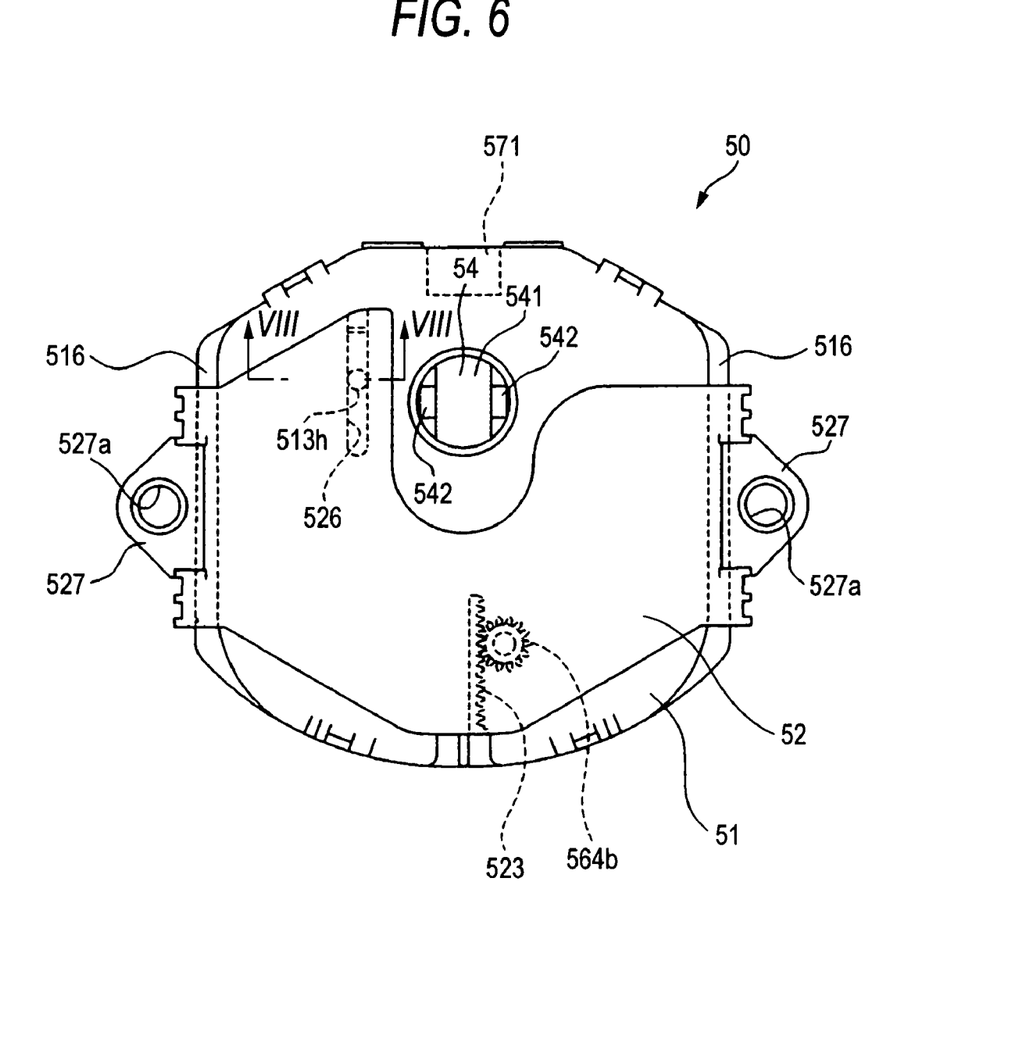
FIG. 6 is a plan view schematically illustrating the two-function actuator.

As will be understood from FIGS. 4, 6, 8 and 9, the sub-bracket 52 has a notch 522 formed being opened at the front end nearly at the central portion of the front end of the upper surface portion 521 in the right-and-left direction and, further, has a rack 523 formed at the rear end portion thereof extending in the back-and-forth direction just on the lower side of the upper surface portion 521. Side walls 524, 524 are protruding downward from both the right and left side edges of the upper surface portion 521, and slide grooves 525, 525 are formed in a state of facing the inner surfaces of the side walls 525, 525 in parallel with each other and extending in the back-and-forth direction. A turn-limit groove 526 (see FIGS. 6, 8) is formed in the lower surface of the upper surface portion 521 extending in the back-and-forth direction at a position along one side edge of the notch 522. Further, outwardly protruding attaching pieces 527, 527 are formed on the outer surfaces of the side walls 524, 524, and screw insertion holes 527a, 527a are formed in the attaching pieces 527, 527. FIG. 6 does not show a reinforcing rib 521a (shown in FIGS. 2 and 4) formed on the upper surface of the upper surface portion 521, so that other portions can be seen.

Figure 8:
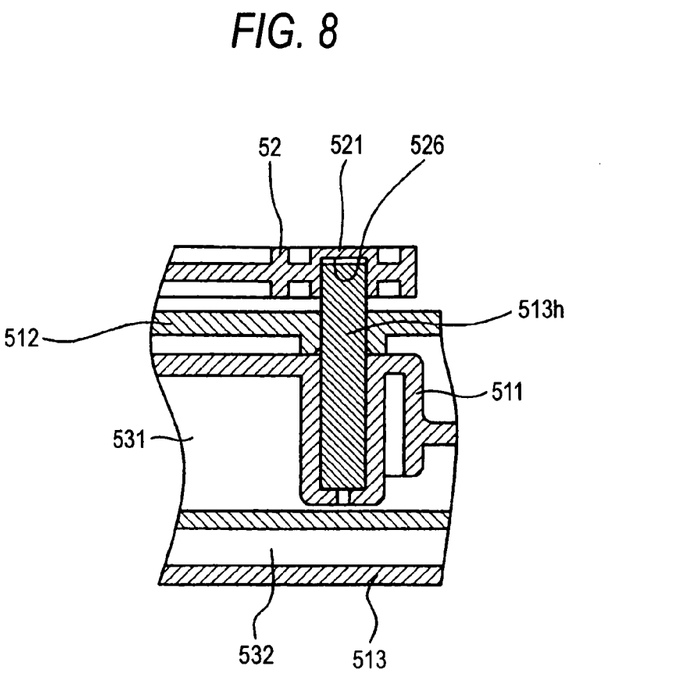
FIG. 8 is a sectional view along the line VIII-VIII in FIG. 6.

The actuator housing 51 incorporating the output shaft 54 and the mechanical portions 55, 56 has the slide rails 516, 516 engaged with the slide grooves 525, 525 of the sub-bracket 52 so as to slide back and forth, has the output shaft 54 positioned in the notch 522 of the sub-bracket 52 so as to slide back and forth, and has a pinion gear 564 of the up-down drive mechanism 55 engaged with a rack 523 of the sub-bracket 52. The turn-limit boss 513h protruding from the upper surface of the actuator housing 51 at a position close to the output shaft 54 engages with the turn-limit groove 526 formed in the lower surface of the sub-bracket 52 so as to slide back and forth.

In the above description, the sub-bracket 52 is constituted separately from the actuator housing 51 and the bracket 40. However, the sub-bracket 52 may be formed integrally with the bracket 40. Namely, a portion having the same function as the sub-bracket 52 may be formed on the bracket 40.

In the two-function actuator 50 constituted as described above, the output shaft 54, output portion (pinion gear 564b) (specifically, a portion that meshes with the rack 523 of the pinion gear 564b) of the up-and-down tilting means and the connector 571 are arranged nearly on a straight line extending in the back-and-forth direction at positions nearly equal to the right and left slide rails 516, 516. Therefore, the two-function actuator 50 of one kind can be used for either the right or the left lamp device. Therefore, the two-function actuators of different specifications do not have to be provided for the right and left lamp devices, respectively. This makes it possible to lower the costs of the two-function actuator 50 and of the bracket 40 for supporting the two-function actuator 50.

When the right-left motor 551 is driven in the two-function actuator 50 assembled with the actuator housing 51 and the sub-bracket 52, the output shaft 54 rotates about the axis that extends in nearly the vertical direction. When the up-down motor 561 is driven, the pinion gear 564b rotates. Therefore, the pinion gear 564 rotates along the rack 523 of the sub-bracket 52, and the actuator housing 51 has its slide rails 516, 516 guided along the side grooves 525, 525 of the sub-bracket 52, and moves back and forth relative to the sub-bracket 52.

The two-function actuator 50 is such that the attaching screws 528, 528 are inserted in the screw insertion holes 527a, 527a of the sub-bracket 52 from the lower side, and are screwed into threaded holes (not shown) formed in the lower surface of the lower support portion 43 of the bracket 40, whereby the sub-bracket 52 is fixed to the lower surface of the lower support portion 43 of the bracket 40. Here, the output shaft 54 engages with a coupling recessed portion 371 opened in the lower surface of the coupling boss 37 of the lamp unit 30 passing through the notch 522 in the sub-bracket 52, slide hole 432a in the slide metal 432 provided in the lower support portion 43, and insertion hole 433a in the slide metal 433 that engages with the slide metal 432 so as to slide back and forth. That is, the first engaging portion 541 of the output shaft 54 engages with a portion 371a protruding back and forth of the coupling recessed portion 373, and the second engaging portion 542 engages with a portion 371b protruding right and left of the coupling recessed portion 371. Therefore, the rotation of the output shaft 54 is directly transmitted to the coupling boss 37. When the output shaft 54 moves in the back-and-forth direction, a relative rotation occurs between the second engaging portion 542 of the output shaft 54 and the portion 371b protruding right and left of the coupling recessed portion 371.

In the headlight 10 for automobiles, when the right-left motor 551 is driven, the output shaft 54 rotates via the transmission gears 552, 553 and 554. When the output shaft 54 rotates, the rotational force is transmitted to the coupling boss 37 that is meshed with the output shaft 54. Therefore, the lamp unit 30 having the coupling boss 37 turns about the axis connecting the centers of the shaft 35 and the coupling boss 37, i.e., turns nearly in the right-and-left direction. Therefore, the direction of irradiation by the lamp unit 30 is changed in the right-and-left direction. When the output shaft 54 rotates, the rotational moment acts on the actuator housing 51 due to the reaction caused by the weight of the lamp unit 30. Here, however, the turn of the actuator housing 51 is limited by the engagement of the turn-limit boss 513h protruding from the actuator housing 51 with the turn-limit groove 526 in the sub-bracket 52. Therefore, the direction of irradiation is correctly adjusted in the right-and-left direction. Here, the turn-limit boss may be formed on the sub-bracket and the turn-limit groove may be formed in the actuator housing.

When the up-down motor 561 is driven, the output gear 564 rotates via the transmission gears 562 and 563, and the pinion gear 564b of the output gear 564 relatively feeds the rack 523 of the sub-bracket 52. Since the sub-bracket 52 is fixed to the bracket 40, the pinion gear 564b turns along the rack 523. Therefore, the actuator housing 51 supporting the pinion gear 564b moves back and forth relative to the sub-bracket 52, i.e., relative to the bracket 40. Accordingly, the output shaft 54, too, moves back and forth, and the coupling boss 37 meshed with the output shaft 54 moves back and forth together with the output shaft 54 causing the lamp unit 30 to be tilted up and down with the automatic centering metal 36 as a center of turn. Thus, the direction of irradiation by the lamp unit 30 is changed in the up-and-down direction. At this moment, a relative turn is produced between the second engaging portion 542 of the output shaft 54 and the portion 371b protruding right and left of the coupling recessed portion 371, and a sliding motion is produced between the automatic centering metal 36 and the shaft 35. As described above, further, the coupling boss 37 is placed on the thrust metal 433 and, therefore, the weight of the lamp unit 30 is supported by the slide metal 432 via the thrust metal 433 and is, therefore, supported by the lower support portion 43 of the bracket 40 without permitting the weight of the lamp unit 30 to be exerted on the output shaft 54 of the two-function actuator 50. Accordingly, no extra load is exerted on the motion of the output shaft 54 in the back-and-forth direction, and the direction of irradiation can be correctly adjusted in the up-and-down direction.

In the above headlight 10 for automobiles, the actuator for changing the direction of irradiation in the right-and-left direction and in the up-and-down direction is constituted as a single device using a decreased number of parts, contributing to lowering the cost and to decreasing the number of working steps for assembling. Further, the lamp unit and the actuator are coupled together at one place enhancing general applicability, and in this respect, too, it can be expected to lower the cost by mass production.

DESCRIPTION OF REFERENCE NUMERALS 10-headlight for automobiles (lamp device for vehicles)
30-lamp unit
40-bracket (support body)
50-two-function actuator (actuator)
51-actuator housing
513h-turn-limit boss
516-slide rails
52-sub-bracket
526-turn-limit groove
54-output shaft
55-right-left drive mechanism (turning means for turning the output shaft)
54, 55-right-left tilt means
56-up-down drive mechanism (up-down tilting means)
564b-pinion bear (output portion of up-down tilting means)
571-connector While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A lamp device for vehicles comprising:
a lamp unit for irradiating light in a desired light distribution pattern,
a support body configured to support said lamp unit so as to be tiltable up and down, and tiltable right and left, and
an actuator for tilting said lamp unit up and down with respect to said support body, and for tilting said lamp unit right and left with respect to said support body; wherein
said actuator comprises right-and-left tilting means and up-and-down tilting means provided in an actuator housing;
said right-and-left tilting means comprises an output shaft capable of turning in a right-and-left direction coupled to said lamp unit; and
said up-and-down tilting means comprises an output portion capable of moving said actuator housing back and forth with respect to the support body.

2. A lamp device for vehicles comprising:
a lamp unit for irradiating light in a desired light distribution pattern,
a support body configured to support said lamp unit so as to be tiltable up and down, and tiltable right and left, and
an actuator for tilting said lamp unit up and down with respect to said support body, and for tilting said lamp unit right and left with respect to said support body; wherein
said actuator comprises right-and-left tilting means and up-and-down tilting means provided in an actuator housing;
said right-and-left tilting means comprises an output shaft capable of turning in a right-and-left direction coupled to said lamp unit;
said up-and-down tilting means comprises an output portion capable of moving said actuator housing back and forth with respect to the support body; and
said actuator housing is supported by said support body via slide rails extending in a back-and-forth direction.

3. The lamp device for vehicles according to claim 2, wherein said slide rails are provided on the outermost sides on both the right and left sides of the actuator housing.

4. The lamp device for vehicles according to claim 3, wherein in said actuator, said output shaft of said right-and-left tilting means, said output portion of said up-and-down tilting means, and a connector for feeding power supply and control signals to said right-and-left tilting means and said up-and-down tilting means are arranged nearly on a straight line extending in the back-and-forth direction and at positions maintaining nearly an equal distance to said right and left slide rails.

5. The lamp device for vehicles according to claim 2, wherein said actuator housing is supported by said support body via a sub-bracket that supports said slide rails so as to slide in the back-and-forth direction, and said actuator housing and said sub-bracket are provided with a turn-limit groove that extends in the back-and-forth direction and with a turn-limit boss that engages with said turn-limit groove so as to slide in the back-and-forth direction.

6. The lamp device for vehicles according to claim 3, wherein said actuator housing is supported by said support body via a sub-bracket that supports said slide rails so as to slide in the back-and-forth direction, and said actuator housing and said sub-bracket are provided with a turn-limit groove that extends in the back-and-forth direction and with a turn-limit boss that engages with said turn-limit groove so as to slide in the back-and-forth direction.

7. The lamp device for vehicles according to claim 4, wherein said actuator housing is supported by said support body via a sub-bracket that supports said slide rails so as to slide in the back-and-forth direction, and said actuator housing and said sub-bracket are provided with a turn-limit groove that extends in the back-and-forth direction and with a turn-limit boss that engages with said turn-limit groove so as to slide in the back-and-forth direction.

8. The lamp device for vehicles according to claim 1, wherein said lamp unit is supported on said support body through a thrust metal and a slide metal.

9. The lamp device for vehicles according to claim 1, wherein said lamp unit comprises a coupling boss connected to said output shaft, and said coupling boss is rotatable relative to said output shaft.

10. A lamp device for vehicles comprising:
a lamp unit supported by a support body so as to be tiltable up and down, and tiltable right and left, and
a two-function actuator for tilting said lamp unit up and down with respect to said support body, and for tilting said lamp unit right and left with respect to said support body;
said two-function actuator comprising, in an actuator housing:
an output shaft capable of turning in a right-and-left direction coupled to said lamp unit; and
an output gear capable of moving said actuator housing back and forth with respect to the support body.

11. The lamp device for vehicles according to claim 10, wherein said actuator housing is supported by said support body via slide rails extending in a back-and-forth direction.

12. The lamp device for vehicles according to claim 11, wherein said slide rails are provided on the outermost sides on both the right and left sides of the actuator housing.

13. The lamp device for vehicles according to claim 12, wherein in said two-function actuator, said output shaft, said output gear, and a connector for feeding power supply and control signals to said two-function actuator are arranged nearly on a straight line extending in the back-and-forth direction and at positions maintaining nearly an equal distance to said right and left slide rails.

14. The lamp device for vehicles according to claim 11, wherein said actuator housing is supported by said support body via a sub-bracket that supports said slide rails so as to slide in the back-and-forth direction, and said two-function actuator housing and said sub-bracket are provided with a turn-limit groove that extends in the back-and-forth direction and with a turn-limit boss that engages with said turn-limit groove so as to slide in the back-and-forth direction.

15. The lamp device for vehicles according to claim 10, said two-function actuator further comprising: two motors and a plurality of transmission gears, wherein the plurality of transmission gears are arranged to transmit rotation of one of the two motors to the output shaft and rotation of the other of the two motors to the output gear.

16. The lamp device for vehicles according to claim 15, wherein said two-function actuator further comprising a control circuit, wherein said control circuit controls rotations of said two motors based on control signals fed to said control circuit.

* * * * *